(12) United States Patent
Van De Loo et al.

(10) Patent No.: US 7,159,288 B2
(45) Date of Patent: Jan. 9, 2007

(54) CLAMPING ASSEMBLY

(75) Inventors: Paul Van De Loo, Norton Summit (AU); Aaron Anthony Arnold, Fullerton (AU); Jarrod Leigh Dorney, Warnambool (AU)

(73) Assignee: Rapidjoint Pty. Ltd. (AU)

( * ) Notice: Subject to any disclaimer, the term of this patent is extended or adjusted under 35 U.S.C. 154(b) by 0 days.

(21) Appl. No.: 10/524,220

(22) PCT Filed: Aug. 8, 2003

(86) PCT No.: PCT/AU03/01007

§ 371 (c)(1),
(2), (4) Date: Feb. 8, 2005

(87) PCT Pub. No.: WO2004/014611

PCT Pub. Date: Feb. 19, 2004

(65) Prior Publication Data

US 2005/0257356 A1 Nov. 24, 2005

(30) Foreign Application Priority Data

Aug. 9, 2002 (AU) ............................. 2002950670

(51) Int. Cl.
*B23P 19/04* (2006.01)
(52) U.S. Cl. .......................................... 29/238; 29/239
(58) Field of Classification Search ................ 29/238, 29/239, 235, 278; 254/103
See application file for complete search history.

(56) References Cited

U.S. PATENT DOCUMENTS 5,123,629 A * 6/1992 Takeuchi ................. 254/103

5,810,333 A * 9/1998 Hickerson et al. ........ 254/93 R

FOREIGN PATENT DOCUMENTS

| AU | A 35441/93 | 3/1993 |
| CH | 601 681 | 4/1976 |
| DE | 29819955 | 4/1999 |
| EP | 0 292 921 | 5/1988 |
| JP | 08135029 A | 5/1996 |
| JP | 08-159121 | 6/1996 |
| JP | 2000-130414 | 5/2000 |
| JP | 2001289501 A | 10/2001 |
| WO | WO-03/035992 | 5/2003 |
| WO | WO-03/095847 A1 | 11/2003 |

OTHER PUBLICATIONS

International Search Report mailed Sep. 1, 2003 Issued by the Patent Cooperation Treaty (PCT) for International Patent Application No. PCT/AU2003/01007 filed Aug. 8, 2003.

* cited by examiner

*Primary Examiner*—Lee D. Wilson
(74) *Attorney, Agent, or Firm*—Sheridan Ross P.C.

(57) ABSTRACT

An adjustable clamp assembly (600) includes an elongated connection member (640) and a gear assembly (650). The gear assembly includes a rotatable first gear member having an axis of rotation substantially perpendicular to a longitudinal axis of the connection member (640). The gear assembly also includes a second gear member cooperatively engaged with the first gear member. The clamp assembly further includes a first clamp member (630). The elongated connection member (640), the gear assembly (650) and the first clamp member (630) are arranged such that rotation of the first gear member results in a linear motion of the first clamp member (630) parallel to the longitudinal axis of the connection member (640).

20 Claims, 10 Drawing Sheets

CLAMPING ASSEMBLY

FIELD OF INVENTION

The present invention relates to adjustable clamps.

BACKGROUND OF INVENTION

An adjustable clamp is a tool which is used, for example, to draw two surfaces together in a clamping action. Also, adjustable clamps can be used to hold surfaces away from each other.

A particular problem is encountered when trying to clamp together two flat surfaces, end to end.

Figure 1:
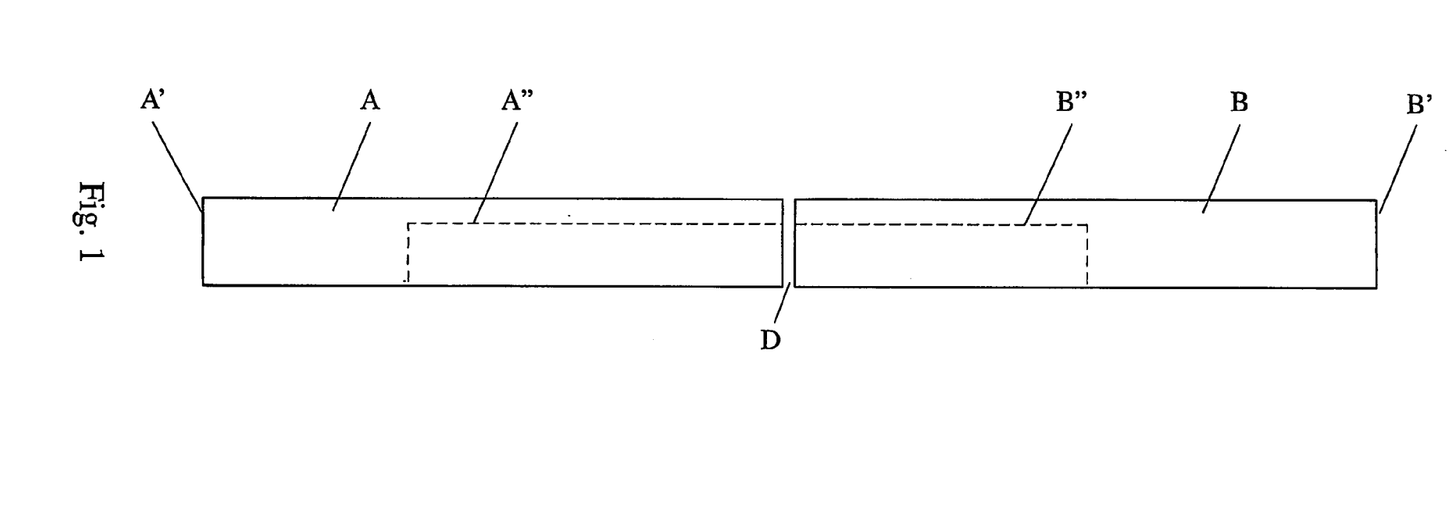
FIG. 1 is a side view of two flat objects which are to be clamped together end to end, the gap between the two objects being exaggerated in the drawing for the sake of clarity.

The problem can be appreciated from FIG. 1 where objects A and B are to be clamped together end to end. (The gap between objects A and B is exaggerated in FIG. 1 for clarity, but the intention is for the two objects to be clamped against each other end to end).

It would be impractical to use a standard clamp, of the type which seeks to compress items positioned between its jaws. For instance in FIG. 1, it would be impractical to position a standard clamp around the end points A' and B', since, in practice, objects A and B are likely to be very long. Moreover, if a standard clamp were to be placed over the end points A' B', a likely result when the clamping portions are brought together is that objects A and B may be forced out of linear alignment.

A known approach for clamping thin objects together end to end involves creating cut-out portions in the objects, and using clamps to pull the cut-out portions together. An example of a known cut-out arrangement is shown in FIG. 2a (although the clamp 10 shown in FIG. 2a is not known in the prior art, and is an exemplary embodiment of the present invention).

Figure 2A:
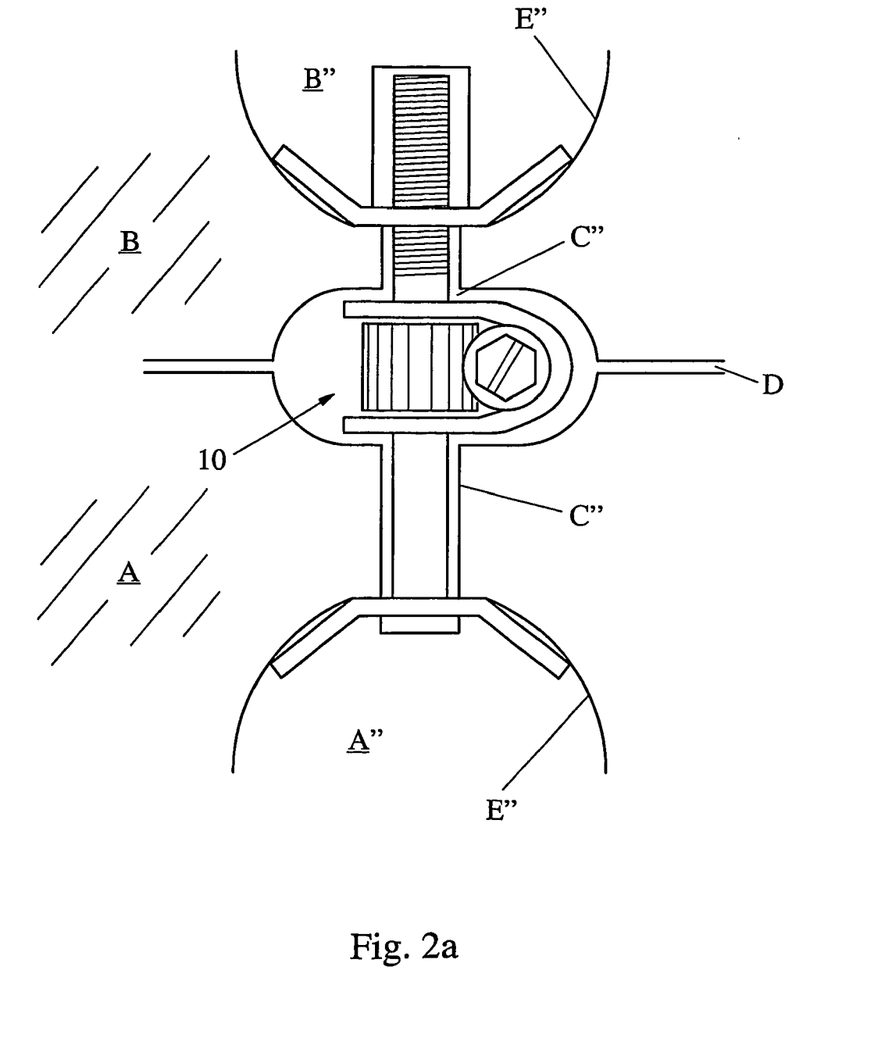
FIG. 2a is a plan view of an embodiment of a clamp of the present invention positioned in a substantially known cut-away arrangement, the clamp being adapted to draw the objects A and B together.

In FIG. 2a, the cut-out arrangement includes cut-away portions A" B" made in objects A and B respectively. In addition, a further cut-out portion C" joins the two cut-away portions A", B", so that a clamp mechanism can be inserted into the combined cut-away portion A", B", C".

The problem remains, however, that it is very difficult to manipulate known clamps in cut-away portions such as the one designated as A", B", C" in FIG. 2.

A reason for the difficulty is that, in use, this form of clamping needs to be implemented sometimes on the undersurfaces of benches or tables, which exacerbates the problem of the user having to manipulate the clamp in such a confined area.

Prior art clamps have typically been manipulated using spanners or by turning a small lever arm, which requires the spanner or lever arm to be swept through an arc. In FIG. 2a, when a known clamp resides in the cut-out portion A", B", C", it would be difficult to sweep the spanner or lever arm through the arc, because the walls and surface of the objects A, B tend to obstruct the sweep of the arc. At best, it is necessary to manipulate the spanner in very small increments, because the walls of the cut-out portion A", B", C" limit the sweep of the arc.

Hence, it is difficult to use a spanner to rotate the appropriate part of a prior art clamp, because the surfaces of the objects A, B hinder access of the spanner to the known clamp residing in the cut-out portion A", B", C".

The problem is made is made more difficult when having to use a spanner to manipulate the clamps in awkward locations such as the undersurfaces of tabletops and benches, and within cupboards or cabinets.

One clamp known the prior art which attempts to overcome the above disadvantages is described in WO 03/035992. This prior art clamp provides a first beveled gear member at one end of the clamp mechanism. A special tool is then provided which engages with a pivot locator positioned in a clamp member located adjacent to the end of the clamp mechanism including the first beveled gear member. The tool includes a second beveled gear member that engages with the first beveled gear member, such that the clamp may be operated by a rotation of the tool about its axis, which lies perpendicular to the axis of the clamp mechanism. Accordingly, the clamp may be operated without the necessity to sweep a spanner or lever through an arc that is obstructed by the walls and surfaces of the objects A, B.

However, there remain a number of disadvantages of the clamp disclosed in WO 03/035992. First, the clamp requires a special tool for its operation. This is a particular disadvantage for tradespersons, who are among the main users of these types of clamps, because the clamp tool must be stored, carried and kept on hand along with other tools of the trade. The clamp tool may easily be misplaced, lost, or simply not be within reach at the moment it is required. It is accordingly preferable that the clamp may be operated using a general purpose tool, such as a screwdriver or similar, that the tradesperson will always require and have on hand in the course of work.

Furthermore, space constraints limit the gear ratio achievable between the first gear member located on the clamp mechanism, and the second gear member located on the clamp tool. Accordingly, the torque delivered to the clamp mechanism is similar to the torque applied to the tool. In applications requiring high clamping force, it may be therefore be difficult to apply sufficient torque to the tool. In attempting to apply a high torque, the tool may easily slip from the pivot locator, which may result in injury to the operator, and/or stripping of the beveled gears on the clamp mechanism and the tool.

Additionally, all prior art clamps require the operator to hold the clamping mechanism in place during the initial stages of adjustment, until the clamp engages the surfaces to be held together with sufficient force to retain the mechanism in place. This may be difficult to achieve in awkward spaces, in which the task could be simplified if the operator were able to free up the hand not required for operation of the clamp.

It is therefore an object of the present invention to overcome or at least mitigate one or more of the problems in the above prior art, or to provide an improved alternative.

It is to be noted that any discussion of documents, devices, acts or knowledge in this specification is included to explain the context of the invention. It should not be taken as an admission that any of the material formed part of the prior art base or the common general knowledge in the relevant art on or before the priority date of the claims herein.

SUMMARY OF THE INVENTION

According to one aspect of the present invention there is provided an adjustable clamp assembly including:

an elongated connection member having a longitudinal axis;

a gear assembly including a rotatable first gear member having an axis of rotation substantially perpendicular to said longitudinal axis and a second gear member cooperatively engaged with the first gear member; and a first clamp member;

wherein the elongated connection member, the gear assembly and the first clamp member are arranged such that rotation of the first gear member results in a linear motion of the first clamp member parallel to said longitudinal axis.

This arrangement provides the advantage over the prior art that the clamp may be operated by rotation of the first gear member along an axis directed away from the surface of the objects to be clamped, avoiding the necessity to sweep a spanner or lever through an arc that is obstructed by the walls and surfaces of the objects. Furthermore, all components required to achieve this benefit are provided within the clamp assembly, and there is accordingly no requirement for a tool adapted specifically to operate the clamp assembly.

Preferably, the elongated connection member includes a cylindrical member having a threaded portion proximate an end thereof. The first clamp member may be connectable to the cylindrical member by screw-thread engagement with said threaded portion such that rotation of the cylindrical member results in a linear motion of the clamp member parallel to the longitudinal axis of the cylindrical member in a direction depending upon the sense of the rotation.

In some embodiments the second gear member is arranged to rotate about the longitudinal axis of the cylindrical member. The second gear member may be engaged with the cylindrical member such that rotation of the second gear member results in rotation of the cylindrical member. Furthermore, the second gear member may be integral with the cylindrical member.

In alternative embodiments the clamp assembly preferably includes a rotatable sleeve member arranged to rotate about the longitudinal axis of the cylindrical member and connectable thereto by screw-thread engagement with the threaded portion, the sleeve member being engaged with the first clamp member such that rotation of the sleeve member results in a linear motion of the first clamp member parallel to the longitudinal axis of the cylindrical member in a direction depending upon the sense of the rotation.

In embodiments including a sleeve member it is preferred that the second gear member is fixed to the sleeve member such that rotation of the second gear member results in rotation of the sleeve member. The second gear member may be integral with the sleeve member. In particularly preferred embodiments of this type, the first gear member is located in a bracket integral with the first clamp member. This arrangement provides the particular advantage that the first clamp member, the gear assembly and sleeve member may be employed together with threaded cylindrical connecting members known in the art, such as the connecting members of prior art clamp assemblies, or conventional threaded bolts. This enables the clamp assembly to be manufactured in a more cost effective manner, and increases its versatility when used to replace or improve upon existing clamp assemblies.

In preferred embodiments, the clamp assembly includes a second clamp member opposed to the first clamp member such that linear motion of the first clamp member parallel to the longitudinal axis causes the first and second clamp members to be drawn closer together or further apart depending upon the direction of the linear motion. Preferably, the second clamp member is located proximate an end of the cylindrical member opposed to said threaded end. The second clamp member may be able to rotate freely about the longitudinal axis of the cylindrical member.

In one preferred embodiment, the first gear member is located in a bracket integral with the second clamp member. Advantageously, this arrangement may result in a clamp assembly that may be applied in a recess suitable for receipt of a prior art clamp, without the need for any additional space in the recess to accommodate the gear assembly.

Advantageously, the gear ratio between the first gear member and the second gear member may be a reduction ratio. This provides the particular benefit that the clamp assembly may accordingly be operated to apply a clamping force by application of a reduced torque to the first gear member which provides ease of operation especially when the torque is to be applied manually, such as with a manual screwdriver.

In particularly preferred embodiments, the gear assembly is a worm gear assembly, wherein the first gear member includes a worm gear and the second gear member includes a worm wheel. A worm gear assembly provides the advantage of enabling a particularly high reduction ratio to be achieved, further reducing the torque required to be applied to the first gear member.

The first gear member may include connecting means shaped to engage with a rotation mechanism to facilitate rotation of the first gear member. The connecting means may be a recess in an end face of the first gear member, said recess being shaped to engage with the head of a rotation mechanism, such as a flat head screwdriver, Phillips head screwdriver, or Allen key, to facilitate rotation of the first gear member. Advantageously, this arrangement enables the clamp assembly to be operated using an appropriate standard tool, without the need for any specialized tool for operation of the clamp. Accordingly, the rotation mechanism may be a manual or automated rotation mechanism.

The adjustable clamp assembly may further include a retaining member for holding the clamp assembly in place within a recess during adjustment. The retaining member provides the advantage that the clamp may accordingly be fitted into place prior to adjustment, such that the operator is not required to hold the clamp in place during adjustment, making the clamp easier to use in awkward spaces such as under benches and within the interior of cupboards and cabinets.

The retaining member may be a plastic structure, and may be removably attached to the elongated connection member. In a preferred embodiment, the retaining member includes first and second opposing wedge members arranged adjacent to the elongated connection member, each of said wedge members including a wing portion associated with a resilient hinge portion biased such that a restoring force is exerted by the wing portion against a compressive force applied thereto and substantially directed towards the elongated connection member.

According to another aspect of the present invention there is provided an engagement assembly for use with an adjustable clamp assembly that includes a cylindrical connection member having a threaded portion, said engagement assembly including:

a rotatable sleeve member having a central axis of rotation and being connectable to the cylindrical connection member by screw-thread engagement with said threaded portion;

a clamp member; and a gear assembly including a rotatable first gear member and a second gear member cooperatively engaged with the first gear member;

wherein the gear assembly is engaged in use with the sleeve member such that rotation of the first gear member about an axis substantially perpendicular to the central axis of the sleeve member results in rotation of the sleeve member about the central axis, and the clamp member is engaged in use with the sleeve member such that linear motion of the sleeve member parallel to the central axis results in corresponding linear motion of the clamp member.

Advantageously, the engagement assembly may be employed in a convenient and cost-effective manner together with threaded cylindrical connecting members known in the art, such as the connecting members of prior art clamp assemblies, or conventional threaded bolts, to form an adjustable clamp assembly in accordance with the invention. It may accordingly be unnecessary to provide connecting members that have been custom-designed for use with the engagement assembly.

The second gear member may be engaged with the sleeve member such that rotation of the second gear member results in rotation of the sleeve member. In preferred embodiments, the second gear member is integral with the sleeve member.

BRIEF DESCRIPTION OF THE DRAWINGS

Further benefits and advantages of the clamping assembly of the present invention will become apparent in the following description of preferred embodiments of the invention, which should not, however, be considered to limit the scope of the invention or any of the preceding statements. In order that the invention might be more fully understood, embodiments of the invention will be described with reference to the accompanying drawings, in which:

FIG. 4b is a bottom perspective view of the embodiment of FIG. 4a;

FIG. 5b is a bottom perspective view of the embodiment of FIG. 5a;

FIG. 6b shows a gear assembly and rotatable sleeve member engaging with a threaded connection member of the embodiment of FIG. 6a.

DESCRIPTION OF PREFERRED EMBODIMENTS

Referring to the drawings, FIG. 1 illustrates a side view of two elongated flat objections A, B which are to be joined end to end as shown in the diagram. (The gap D between the objects is exaggerated in the diagram for clarity, but it is intended to clamp the objects end to end).

FIG. 2a shows a plan view of a portion of the two objects A, B to be clamped together end to end.

Within the objects A, B, had been created cut-away portions A", B" and C".

Within these cut-away portions, a first embodiment of an adjustable clamp assembly 10 is positioned.

Figure 2B:
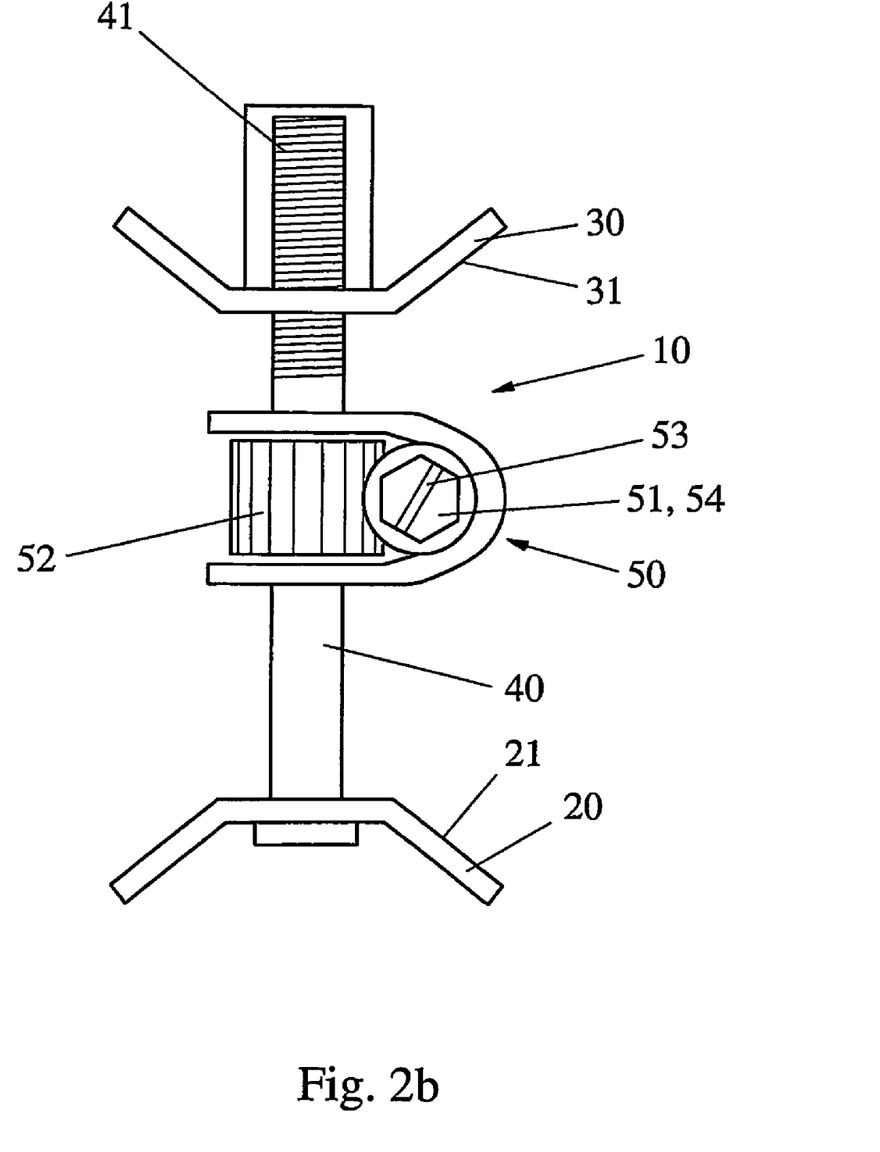
FIG. 2b is the same adjustable clamp of FIG. 2a shown in isolation.

The clamp assembly 10 is described with reference to FIG. 2b, shown in isolation from the objects A, B, so that the details of the clamping assembly can be understood readily.

The clamp 10 includes first and second clamp members in the form of a first clamp component 30 and a second clamp component 20.

As seen in FIG. 2a, the clamp components 20, 30 are adapted to co-operatively bring together the wall surfaces E" of the cut-out portions A", B". Effectively, when the clamp 10 draws the two surfaces E" together, this draws together the two end surfaces of the objects A, B.

In FIG. 2b, the two clamping components 20, 30 have inner surfaces 21, 31 that are adapted to abut against the surfaces E".

In FIG. 2b, the second clamp component 20 has an inner surface 21, while the first clamp component 30 has an inner surface 31.

As seen in FIG. 2b, both the inner surfaces 21, 31 of the second and first clamp members 20, 30 generally face each other.

The clamp components 20, 30 are able to be joined together, as shown in FIG. 2b, by an elongated connection member in the form of rod 40.

The rod 40 is an elongated cylindrical member, which has a threaded portion 41 at one end.

The second clamp component 20 is rotatably connected proximate an end of the rod 40. The rotatable connection allows the rod 40 to rotate in a hole (not shown) located in a side of the second clamping component 20.

The first clamp component 30 is able to be connected to the other end of the rod 40 by the screw-thread 41. This means that the first component 30 is not fixed to a particular location on the end of the rod, but rather is able to be positioned at any portion along the length of the screw-threaded portion 41.

Accordingly, rotation of the rod 40, causes the inner surfaces 21, 31 of the clamp components 20, 30 to be either drawn together or apart along a path of linear motion, depending on the direction of the rotation of the rod.

In order to facilitate rotation of the rod 40, the adjustable clamp 10 is provided with a gear assembly which in the embodiment shown in FIG. 2b is a worm drive assembly 50. The worm-drive assembly includes a worm gear 51, which co-operates with another gear 52, being a worm wheel located on the body of the rod 40. In FIG. 2b, the gear 52 is a spur gear, although in other embodiments the gear 52 can be a helical gear, for example.

The worm drive mechanism of the assembly 50 is able to provide rotation of the rod 40. Known modifications and variations in worm gear technology can be incorporated.

The worm drive assembly 50 is provided with a connection means that enables a rotation mechanism, in the form of, for example, an electric screwdriver (or an electric drill with a screwdriver bit) or a hand or manually operated screwdriver, to be connected to the worm gear 51.

Figure 3:
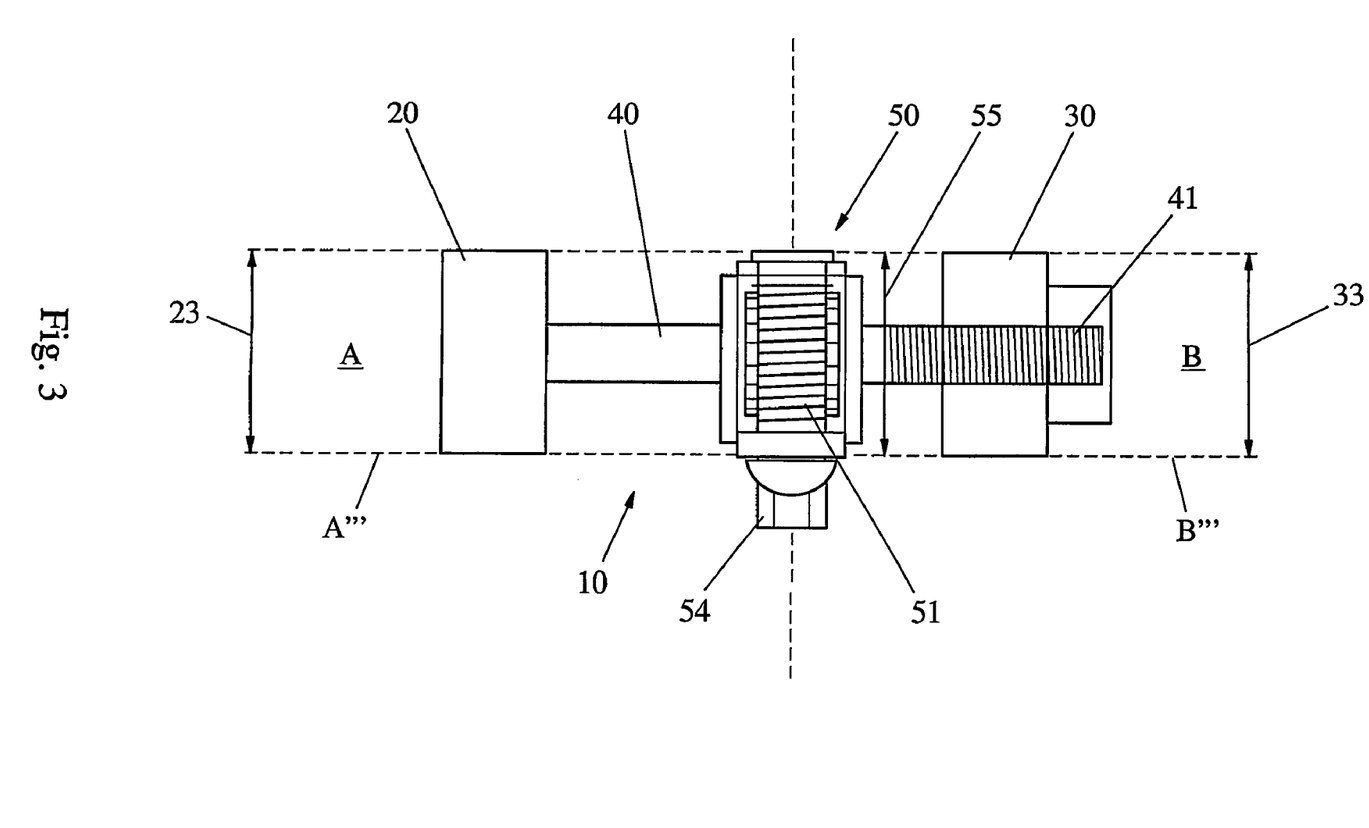
FIG. 3 is a cross-sectional side view of the clamp of FIG. 2b.

In an embodiment of the invention as shown in FIG. 3, the connection means is in the form of a hexagonal nut 54 which enables a correspondingly-shaped socket or socket bit for an electric drill to fit over the nut 54, so that the drill provides powered rotation of the worm gear 51. Thus, the rotation of the rod 40 can be activated by a powered or automatic rotation drive. The use of a worm gear enables a user to operate the clamp by conveniently rotating the worm gear.

In other embodiments of the invention, the end of the worm gear 51 is provided with a screw driver-receiving slit 53 (FIG. 2a), which enables the user to rotate the worm drive 51 by inserting a screw driver, which may be an automatic (powered) screwdriver or a manual (hand operated) screwdriver. In the case of a manual adjustment, a particular benefit is derived by the use of a gear assembly having a gear ratio that is a reduction ratio, since this enables the clamp to be operated to apply a clamping force by application of a reduced torque to the worm gear 51.

The user is thus able to rotate the rod 40 by rotating the worm gear 51, which does not require a spanner to sweep through an arc. Thus, when the clamp 10 is used, for instance, in the cut-out portion A'', B'', C'' (in FIG. 2a), the clamp can be manipulated without the problem of the walls of the cut-out portion obstructing the manipulation of the clamp 10.

This advantage is present in both the manual and automatic operations described above, ie the hand rotated worm gear or the powered rotated worm gear. The user is able to more conveniently rotate the worm gear 51 of the present embodiments, compared to a situation where the user has to use a spanner, to directly rotate the rod 40, that has to sweep through an arc.

For example, in FIG. 3, a side view of the clamp assembly is shown located in the cut-away portion of the objects A, B. (The surfaces A''', B''' of the objects A and B are shown in dotted lines). One can imagine that if the rod 40 had to be rotated with a spanner that has to sweep through an arc, for instance, the walls of the cut-away portion would make it difficult for the spanner to sweep through its entire arc. The limitation of the arc of rotation of the spanner would be limited by a surface which, in FIG. 3, is represented with a dotted line A''', B'''.

In contrast, the present invention does not have this limitation, because the user is able to rotate the rod 40 by rotating the worm gear 51 which is readily accessible. Particularly, when the surface A''', B''' faces downwards, the convenience of the present embodiment is more readily appreciated. This could occur for instance when the surfaces A''', B''' are on an undersurface of a table.

As seen in FIG. 3, the height dimension 55 of the body of the worm drive assembly 50 preferably is substantially the same as, or is less than, the height dimensions 23, 33 of the clamp components 20, 30. This is to ensure that, in use, the worm drive assembly 50 will not protrude or will not protrude substantially, above the surface A''', B''' of the objects A, B, being clamped together by the clamping assembly 10.

Figure 4A:
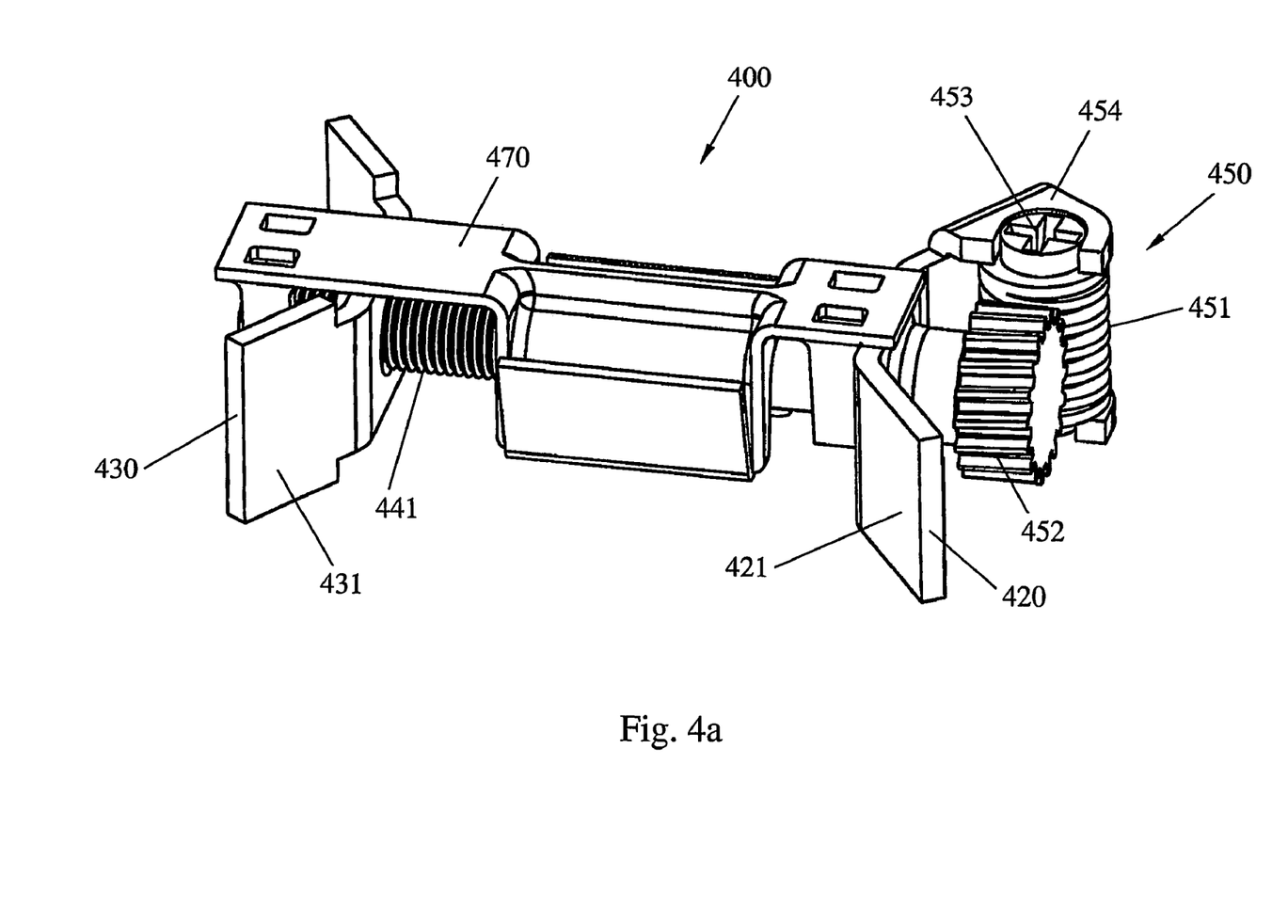
FIG. 4a is a top perspective view of a further embodiment of a clamp according to the present invention.
Figure 4B:
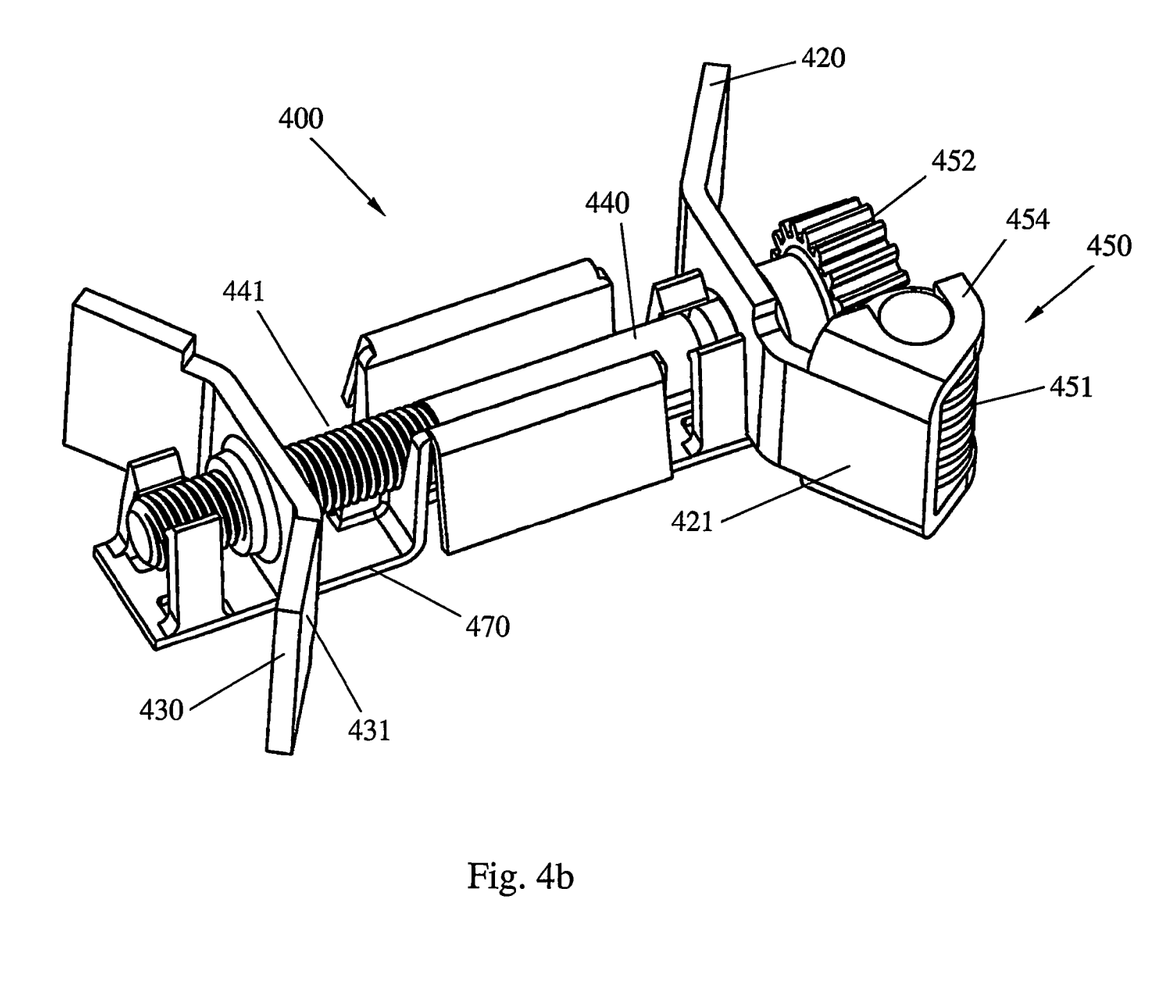

An alternative embodiment of the clamp assembly 400, providing additional advantages over prior art clamps, is shown from a top perspective view in FIG. 4a. FIG. 4b shows the same assembly 400 from a bottom perspective view.

The adjustable clamp assembly 400 operates in a similar manner to the embodiment 10, and includes first and second clamp members 430, 420 having respective facing inner surfaces 431, 421 adapted to abut against the wall surfaces E'' shown in FIG. 2a. The assembly 400 further includes an elongated connection member in the form of a cylindrical rod 440 having a threaded portion 441 at one end, to which the first clamp member 430 is connected by screw-thread engagement.

A gear assembly in the form of a worm drive assembly 450 incorporates a first gear member having a worm gear 451 and a second gear member having a worm wheel 452. In the embodiment 400, the second gear member is integral with the rod 440, however in other embodiments the second gear member may be a separate component engaged with the rod 440. In either case, the key requirement is that rotation of the second gear member (worm wheel 452) results in corresponding rotation of the connection member (rod 440). The rod 440 passes through a hole in the second clamp member 420, to allow for the free rotation of the rod within the second clamp member.

Accordingly, in a manner similar to the operation of the embodiment 10, rotation of the worm gear 451 causes rotation of the rod 440, which in turn causes the inner surfaces 421, 431 of the clamp components 420, 430 to be either drawn together or apart along a path of linear motion, depending on the direction of the rotation of the rod.

The worm gear 451 is located within a bracket 454 that is integrally formed with the second clamp member 420. Accordingly, the volume occupied by the worm drive assembly 450 is located within the region partially enclosed by the second clamp member 420. As a result, the adjustable clamp assembly 400 does not require the cut-out portion C'' to include a central expansion to accommodate the worm drive assembly. The embodiment 400 therefore has the additional advantage over the alternative embodiment 10 that it is able to be applied within a cut-out portion suitable for receipt of a prior art clamp without requiring that the cut-out portion be adapted to accommodate the worm drive assembly 50 of FIG. 2b.

The worm gear 451 is provided with a connecting means, which in the embodiment 400 consists of a recess 453 in the end face of the worm gear member that is shaped to engage with a rotation mechanism, such as a screwdriver or electric drill having a Phillips head engaging bit. As with the alternative embodiment 10, alternative forms of connecting means may be provided including, but not limited to, a slot recess for engagement with a flat head screwdriver, a hexagonal recess of engagement with an Allen key, or a hexagonal nut for engagement with a corresponding socket bit.

The adjustable clamp assembly 400 also includes a retaining member 470 for holding the clamp assembly in place within the cut-out recess during adjustment. The retaining member 470 is most clearly visible in FIG. 4c, wherein it is shown detached from the clamp assembly.

Figure 4C:
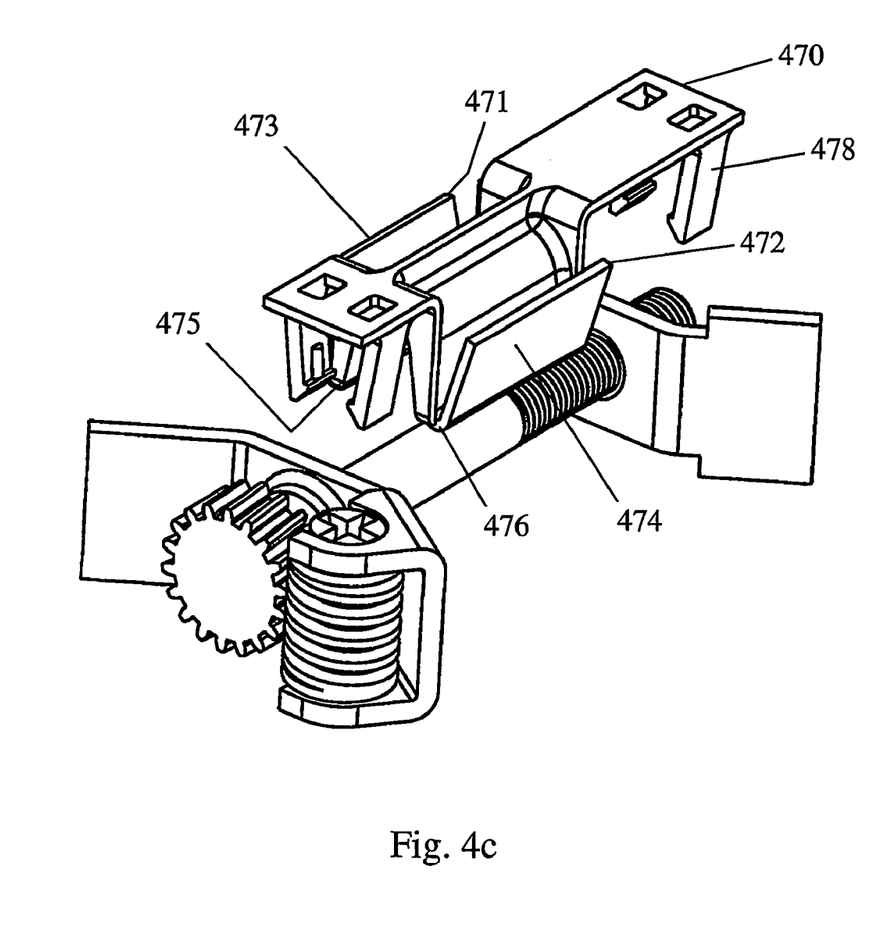
FIG. 4c is a further view of the embodiment of FIG. 4a showing a retaining member detached from the clamp assembly.

As shown in FIG. 4c, the retaining member 470 includes first and second opposing wedge members 471, 472 arranged adjacent to the connection member 440. The wedge members 471, 472 include respective wing portions 473, 474 which are associated with corresponding resilient hinge portions 475, 476 which in the embodiment shown are integrally formed with the retaining member 470. The resilient hinge portions 475, 476 are biased such that a restoring force is exerted by the respective wing portions 473, 474 against a compressive force applied thereto and substantially directed towards the connection member 440 when the retaining member is fitted to the clamp assembly.

Accordingly, when the assembly 400 is pressed into a cut-out recess having a central portion slightly narrower than the distance separating the outer edges of the wing portions 473, 474, the wedge members 471, 472 will be compressed inwards towards the connection member 440, and the resulting restoring force will apply pressure to the interior sides of the recess holding the assembly 400 in place prior to the clamp engaging the surfaces E'' with sufficient force to retain the clamp assembly in place. Advantageously, as a result the operator is not required to hold the clamp in place during adjustment, making the clamp easier to use in awkward spaces such as under benches and within the interior of cupboards and cabinets.

In the embodiment shown in FIGS. 4a, 4b and 4c, the retaining member is made preferably of plastic, and is removably attached to the connection member 440 by way of the resilient engaging members 478.

Figure 5A:
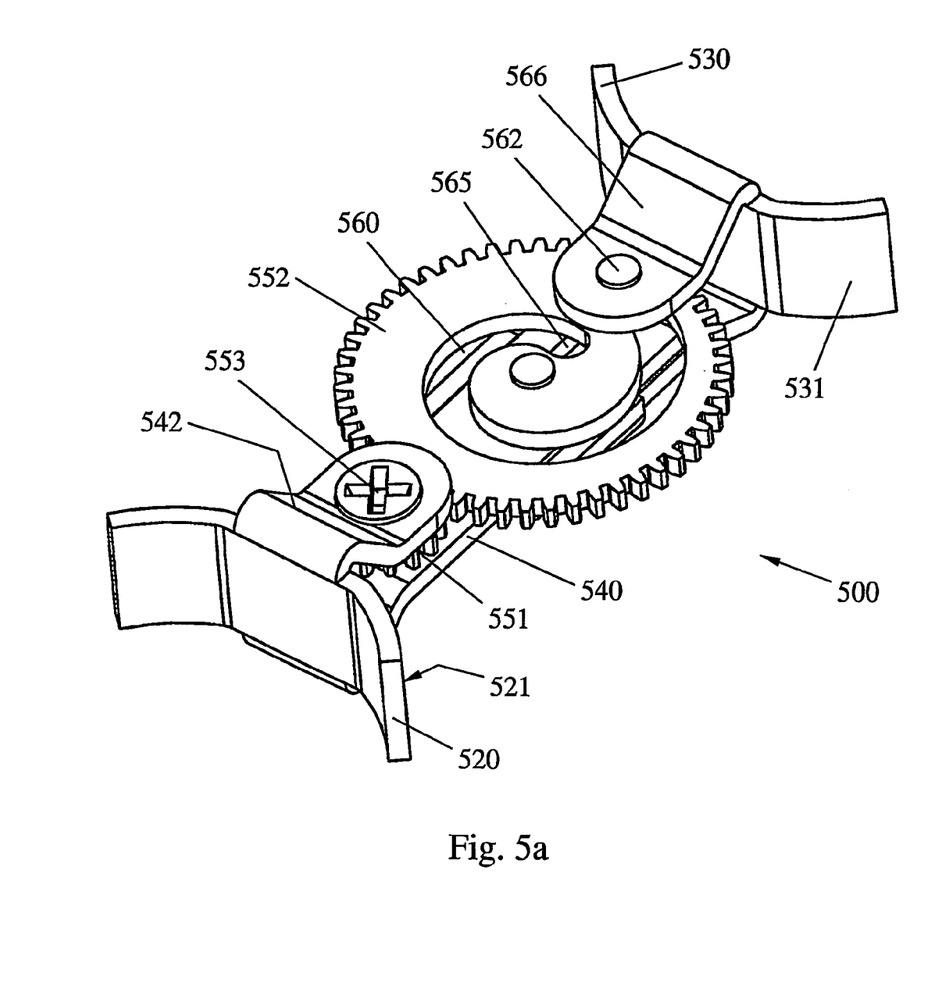
FIG. 5a is a top perspective view of a further alternative embodiment of a clamp according to the present invention.
Figure 5B:
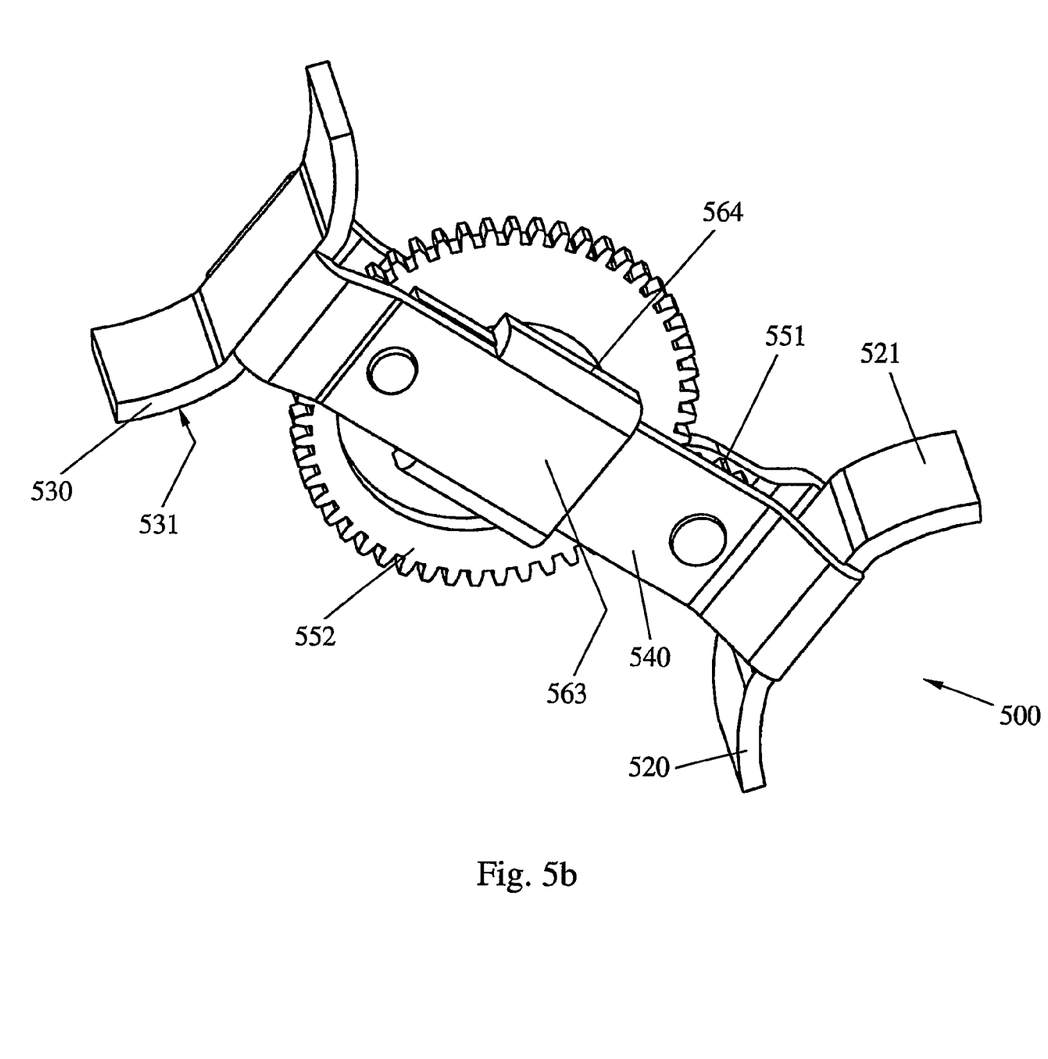

A further alternative embodiment of the clamp assembly 500 is shown from a top perspective view in FIG. 5*a*. FIG. 5*b* shows the same assembly from a bottom perspective view.

The adjustable clamp assembly 500 includes first and second clamp members 530, 520 having respective facing inner surfaces 531, 521 adapted to abut against the surfaces E" shown in FIG. 2*a*. The assembly 500 further includes an elongated connection member in the form of a flat connection member 540 having a substantially rectangular cross section.

The second clamp member 520 is formed integrally with the connection member 540, and an upper bracing member 542. A first gear member in the form of a gear wheel 551 is rotatably engaged between the connection member 540 and upper bracing member 542. The gear wheel 551 is cooperatively engaged with a second gear member in the form of a cam gear 552. The cam gear 552 includes an internal spiral cam portion 560.

The first clamp member 530 is formed integrally with an engaging connection member 563 having a bracket 564 that partially surrounds the connection member 540. An upper brace member 566 is also integrally formed with the first clamp member 530 and engaging connection member 563, and a follower pin 562 is fixed to the upper brace member 566 at one end, and to the engaging connection member 563 at the opposing end, via a slot 565 in the connection member 540.

Accordingly, when the gear wheel 551 rotates, it causes rotation of the cam gear 552, which results in the follower pin 562 being guided inwards or outwards relative to the cam gear 552, depending upon the direction of rotation. The first clamp member 530 is therefore drawn along a path of linear motion either towards or away from the second clamp member 520.

The gear wheel 551 is provided with a connecting means, which in the embodiment 500 consists of a recess 553 in the end face of the gear wheel 551 that is shaped to engage with a rotation mechanism, such as a screwdriver or electric drill, having a Phillips head engaging bit.

Figure 6A:
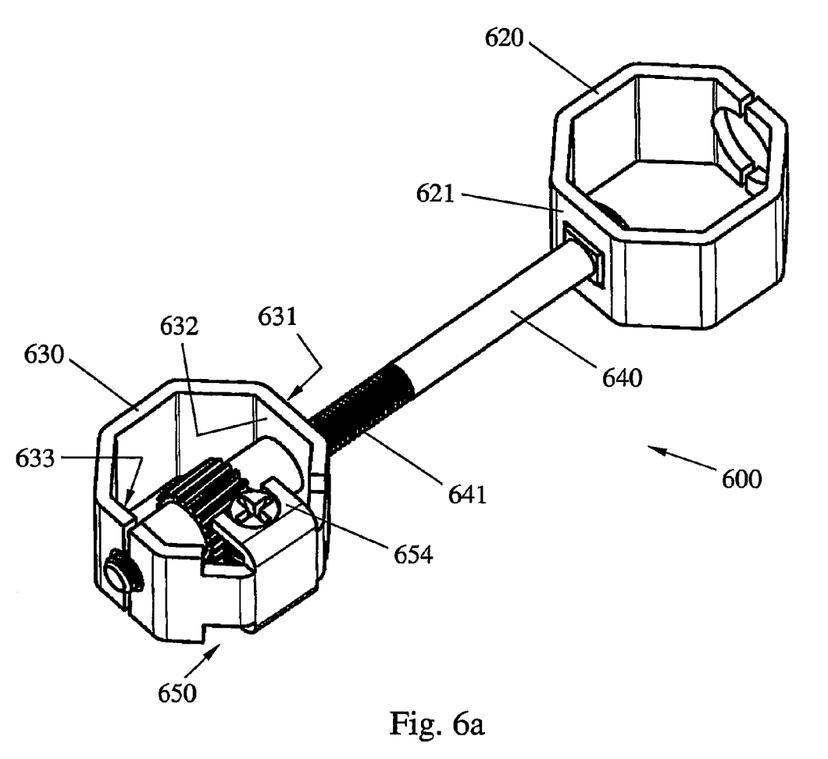
FIG. 6a shows a further alternative embodiment of a clamp according to the present invention.
Figure 6B:
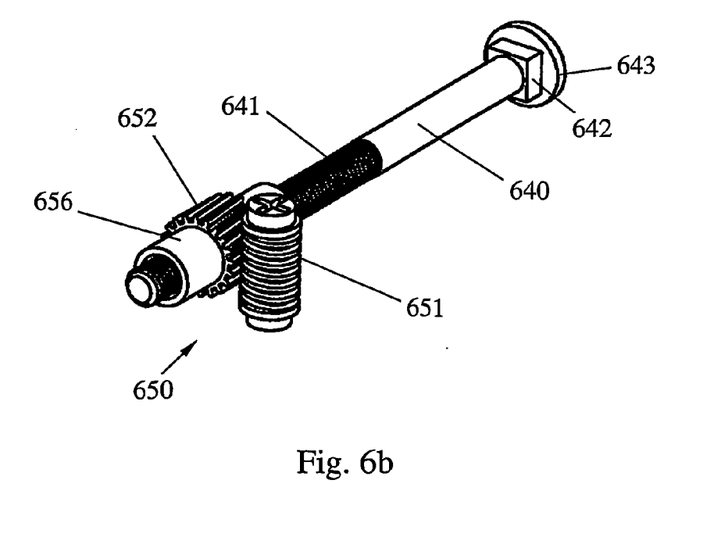

Still a further embodiment of the clamp assembly 600 is shown in FIG. 6*a*. The same assembly is shown in FIG. 6*b*, however the clamping members 620, 630 have been omitted to enable the other components of the assembly to be seen more clearly. The following description refers to both figures.

The adjustable clamp assembly 600 includes first and second clamp members 630, 620 having respective facing inner surfaces 631, 621 adapted to abut against the wall surfaces E" shown in FIG. 2*a*. The assembly 600 further includes an elongated connection member in the form of a cylindrical rod 640 having a threaded portion 641 at one end.

A sleeve member 656 is provided which has an internal thread, enabling it to be connected to the threaded portion 641 of the rod 640 by screw-thread engagement. When so engaged, the sleeve member 656 translates linearly along a path parallel to the axis of the rod 640 when rotated, in a direction that depends upon the sense of the rotation. The first clamp member 630 includes holes allowing the rod 640 to pass through, and the sleeve member 656 engages with the interior surfaces 632, 633 of the first clamp member 630 so that the linear motion of the sleeve member 656 results in corresponding linear motion of the first clamp member 630.

A gear assembly in the form of a worm drive assembly 650 incorporates a first gear member having a worm gear 651 and a second gear member having a worm wheel 652. In the embodiment 600, the second gear member is integral with the sleeve 656, however in other embodiments the second gear member may be a separate component fixed to the sleeve 656. In either case, the key requirement is that rotation of the second gear member (worm wheel 652) results in corresponding rotation of the sleeve member 656.

Accordingly, rotation of the worm gear 651 causes rotation of the sleeve 656, which in turn causes the inner surfaces 621, 631 of the clamp components 620, 630 to be either drawn together or apart along a path of linear motion, depending on the direction of the rotation of the sleeve.

In the clamp assembly 600 a second clamp member 620 is provided having a square aperture in the inner face 621. A shoulder 642 having a corresponding square section is provided proximate to the end of the rod 640, and a round, flat head 643 is formed behind the shoulder 642. Accordingly, when the rod 640 is fully inserted through the aperture as shown, the head 643 rests against the interior surface of the second clamp member 620 preventing further movement of the rod 640 through the aperture, and the sides of the shoulder abut the walls of the aperture. This arrangement ensures that the rod 640 is not able to rotate relative to the second clamp member 620 when the worm gear 651 is rotated causing the worm wheel 652 and sleeve 656 to rotate.

The worm gear 651 is located within a bracket 654 that is integrally formed with the first clamp member 630. The embodiment 600 accordingly shares the advantage of the alternative embodiment 400 that the adjustable clamp assembly does not require the cut-out portion C" to include a central expansion to accommodate the worm drive assembly.

Furthermore, the embodiment 600 has the additional advantage that the complete engagement assembly including the first clamp member 630, the gear assembly 650 and the sleeve member 656 may be provided as a separate unit that may be fitted to any compatible threaded connecting member. Compatible connecting members may include connecting members of existing clamp assemblies known in the art, and conventional threaded bolts.

Accordingly, the engagement assembly may be employed in a convenient and cost-effective manner together with threaded cylindrical connecting members known in the art, and it is possible to avoid the need to provide a connecting member that has been custom-designed for use with the engagement assembly. This may result in a reduced cost of the clamp assembly, and a greater versatility in its application. For example, the engagement assembly may be used to replace a conventional nut on a bolt that is located within a recess or other cavity in which side walls or other obstacles may obstruct the sweep of a spanner.

As in the previously described embodiments, the worm gear 651 may be provided with any suitable connecting means to engage with a rotation mechanism. For example, a recess may be provided as shown in FIGS. 6*a* and 6*b* suitable for receiving a screwdriver or electric drill having a Phillips head engaging bit.

It will also be apparent to those skilled in the art that a retaining member similar to the retaining member 470 for use with the adjustable clamp assembly 400, as described previously with reference to FIGS. 4*a*, 4*b* and 4*c*, may also be provided for use with the embodiment 600.

In another embodiment of the invention, the mechanism of FIG. 2*b* is modified in the sense that, rather than drawing two surfaces together, the components are shaped so that the clamping assembly pushes two surfaces apart. For example, this can be achieved by altering the shape of the clamping components (e.g. 20, 30) so that the ends of the clamping components curve inwardly towards the centre of the clamp, rather than outwardly as in FIG. 2b.

In other modifications, the shape and dimensions of the components can be varied, while maintaining the function of the adjustable clamp assembly.

For instance, the length and shape of curvature of the clamping components can be modified. As is demonstrated by the alternative embodiments presented herein, the length, thickness and shape of the elongated connection member can be modified. The gear assembly may be arranged in different forms and at different locations within the clamp assembly.

In some embodiments, the connection mechanism indicated by reference numeral 54 in the embodiment 10, may be removable from the clamp assembly after the tightening process has been completed. This ensures that, thereafter, the clamp assembly, or a substantial portion of it, resides below the surface A''', B''' of the objects being clamped.

The embodiments have been advanced by way of example only, and modifications are possible within the scope of the invention as defined by the appended claims.

The claims defining the invention are as follows:

1. An adjustable clamp assembly comprising:
    an elongated connection member having a longitudinal axis;
    a gear assembly including a rotatable first gear member having an axis of rotation substantially perpendicular to said longitudinal axis and a second gear member cooperatively engaged with the first gear member;
    a first clamp member;
    wherein the elongated connection member, the gear assembly and the first clamp member are arranged such that rotation of the first gear member results in a linear motion of the first clamp member parallel to said longitudinal axis; and
    a second clamp member opposed to the first clamp member such that linear motion of the first clamp member parallel to the longitudinal axis causes the first and second clamp members to be drawn closer together or further apart depending upon the direction of said linear motion.

2. An adjustable clamp assembly according to claim 1 wherein the elongated connection member includes a cylindrical member having a threaded portion proximate an end thereof, and wherein the second clamp member is able to rotate freely about the longitudinal axis of the cylindrical member.

3. An adjustable clamp assembly according to claim 2 wherein the second clamp member is located proximate an end of the cylindrical member opposed to said threaded end.

4. An adjustable clamp assembly according to claim 1 wherein the elongated connection member includes a cylindrical member having a threaded portion proximate an end thereof, and wherein the second clamp member is not able to rotate freely about the longitudinal axis of the cylindrical member.

5. An adjustable clamp member according to claim 1 wherein the first gear member is located in a bracket integral with the second clamp member.

6. An adjustable clamp assembly according to claim 1 wherein a gear ratio between the first gear member and the second gear member is a reduction ratio.

7. An adjustable clamp assembly according to claim 1 wherein the first gear member includes a worm gear and the second gear member includes a worm wheel.

8. An adjustable clamp assembly according to claim 1 wherein the first gear member includes connecting means shaped to engage with a rotation mechanism to facilitate rotation of the first gear member.

9. An adjustable clamp assembly according to claim 8 wherein the connecting means includes a recess in an end face of the first gear member, said recess being shaped to engage with a head of a rotation mechanism to facilitate rotation of the first gear member.

10. An adjustable clamp assembly according to claim 1 wherein the elongated connection member includes a cylindrical member having a threaded portion proximate an end thereof, and wherein the first clamp member is connectable to the cylindrical member by screw-thread engagement with said threaded portion such that rotation of the cylindrical member results in a linear motion of the clamp member parallel to the longitudinal axis of the cylindrical member in a direction depending upon the sense of the rotation.

11. An adjustable clamp assembly according to claim 10 wherein the second gear member is arranged to rotate about the longitudinal axis of the cylindrical member and is engaged with said cylindrical member such that rotation of the second gear member results in rotation of the cylindrical member.

12. An adjustable clamp assembly according to claim 11 wherein the second gear member is integral with the cylindrical member.

13. An adjustable clamp assembly comprising:
    an elongated connection member having a longitudinal axis;
    a gear assembly including a rotatable first gear member having an axis of rotation substantially perpendicular to said longitudinal axis and a second gear member cooperatively engaged with the first gear member; and
    a first clamp member;
    wherein the elongated connection member, the gear assembly and the first clamp member are arranged such that rotation of the first gear member results in a linear motion of the first clamp member parallel to said longitudinal axis;
    wherein the first gear member includes connecting means shaped to engage with a rotation mechanism to facilitate rotation of the first gear member;
    wherein the connecting means includes a recess in an end face of the first gear member, said recess being shaped to engage with a head,of a rotation mechanism to facilitate rotation of the first gear member; and
    wherein said rotation mechanism includes one of a flat head screwdriver, a Phillips head screwdriver and an Allen key.

14. An adjustable clamp assembly comprising:
    an elongated connection member having a longitudinal axis;
    a gear assembly including a rotatable first gear member having an axis of rotation substantially perpendicular to said longitudinal axis and a second gear member cooperatively engaged with the first gear member;
    a first clamp member;
    wherein the elongated connection member, the gear assembly and the first clamp member are arranged such that rotation of the first gear member results in a linear motion of the first clamp member parallel to said longitudinal axis; and
    further including a retaining member for holding the clamp assembly in place within a recess during adjustment.

15. An adjustable clamp assembly according to claim 14 wherein the retaining member includes first and second opposing wedge members arranged adjacent to the elongated connection member, each of said wedge members including a wing portion associated with a resilient hinge portion biased such that a restoring force is exerted by the wing portion against a compressive force applied thereto and substantially directed towards the elongated connection member.

16. An adjustable clamp assembly according to claim 14 wherein the retaining member is removably attached to the elongated connection member.

17. An adjustable clamp assembly according to claim 14 wherein the retaining member is made of plastic.

18. An adjustable clamp assembly according to claim 1 wherein the elongated connection member includes a cylindrical member having a threaded portion proximate an end thereof, and wherein the clamp assembly further includes a rotatable sleeve member arranged to rotate about the longitudinal axis of the cylindrical member and connectable thereto by screw-thread engagement with said threaded portion, said sleeve member being engaged with the first clamp member such that rotation of the sleeve member results in a linear motion of the first clamp member parallel to the longitudinal axis of the cylindrical member in a direction depending upon the sense of the rotation.

19. An adjustable clamp assembly according to claim 18 wherein the second gear member is engaged with said sleeve member such that rotation of the second gear member results in rotation of the sleeve member.

20. An adjustable clamp assembly according to claim 19 wherein the second gear member is integral with the sleeve member.

* * * * *